(12) United States Patent
Jen et al.

(10) Patent No.: US 8,982,308 B2
(45) Date of Patent: Mar. 17, 2015

(54) ACTIVE LIQUID CRYSTAL ARRAY DEVICE AND THE FABRICATION METHOD THEREOF

(71) Applicant: National Chiao Tung University, Hsinchu (TW)

(72) Inventors: Tai-Hsiang Jen, Taipei (TW); Chih-Wei Chen, Taoyuan County (TW); Yu-Cheng Chang, Taichung (TW); Po-Yuan Hsieh, Changhua (TW); Yi-Pai Huang, Chiayi (TW)

(73) Assignee: National Chiao Tung University, Hsinchu (TW)

( * ) Notice: Subject to any disclaimer, the term of this patent is extended or adjusted under 35 U.S.C. 154(b) by 147 days.

(21) Appl. No.: 13/804,396

(22) Filed: Mar. 14, 2013

(65) Prior Publication Data

US 2014/0176834 A1    Jun. 26, 2014

(30) Foreign Application Priority Data

Dec. 26, 2012   (TW) .............................. 101150023 A

(51) Int. Cl.
| | |
|---|---|
| *G02F 1/1343* | (2006.01) |
| *G02F 1/135* | (2006.01) |
| *G02B 27/22* | (2006.01) |
| *H04N 13/04* | (2006.01) |

(52) U.S. Cl.
CPC ..... *G02B 27/2214* (2013.01); *G02F 2001/134381* (2013.01); *G02F 2201/122* (2013.01); *G02F 1/134363* (2013.01); *H04N 13/0452* (2013.01)
USPC .............................. 349/141; 349/142; 349/49

(58) Field of Classification Search
CPC .................................................. G02F 2201/122
USPC ..................................................... 349/142, 49
See application file for complete search history.

(56) References Cited

U.S. PATENT DOCUMENTS

RE44,167 E * 4/2013 Lee ............................... 349/141

OTHER PUBLICATIONS

Po-Hao Wang, Active-TFTs Liquid Crystal Lens for Multifunctional 3D Displays, Published Date: Jul. 5, 2012.

* cited by examiner

*Primary Examiner* — Wen-Ying P Chen
(74) *Attorney, Agent, or Firm* — Bacon & Thomas, PLLC

(57) ABSTRACT

An active liquid crystal array device is provided. A gate control electrode is disposed on the first transparent conductive substrate, a first transparent insulation layer is disposed on the gate control electrode, a liquid crystal control electrode is disposed on the first transparent insulation layer, a second transparent conductive substrate which includes a transparent electrode and a second liquid crystal oriented layer, and a liquid crystal layer is disposed between the first liquid crystal oriented layer and a second liquid crystal oriented layer.

9 Claims, 22 Drawing Sheets

ACTIVE LIQUID CRYSTAL ARRAY DEVICE AND THE FABRICATION METHOD THEREOF

BACKGROUND OF THE INVENTION

1. Field of the Invention

The present invention relates to a liquid crystal array device, particularly to an active liquid crystal array device with the function of local switchable liquid crystal lens and the function for controlling focus of liquid crystal lens.

2. Description of the Prior Art

The conventional switchable liquid crystal lens array can use the electric control way to switch the liquid crystal on the whole array to obtain the transparent lens effect, and can be used in two-dimensional (2D)/three-dimensional (3D) switchable display for switching the pictures between 2D and 3D.

The electrode with lens shape is used in the structure of switchable liquid crystal lens array. The lens effect of liquid crystal is formed by the gradual change of the electric field. Another way is to use the double refractive material with lens shape, the liquid crystal is sealed in the double refractive material to obtain lens shape for liquid crystal layer, so that the liquid crystal layer can achieve the lens effect.

However, the above-mentioned liquid crystal lens array can only be switched in the whole panel, which is unable to be controlled by the local way, and the focus of liquid crystal lens is also unable to be controlled by the electric way. Therefore, when the liquid crystal lens array is used to the 2D/3D switchable display, it is switched by the whole screen, it is unable to see the characters of 2D and the image content of 3D on the same picture at the same time.

Therefore, it is necessary to develop the active liquid crystal array device with local switchable liquid crystal lens and the function for controlling focus of liquid crystal lens, in order to increase the application of active liquid crystal array device and reduce the manufacturing cost.

SUMMARY OF THE INVENTION

According to the drawbacks of the prior art, the main purpose of the present invention is to disclose an active liquid crystal array device and the fabrication method thereof. This active liquid crystal array device has the function of local switchable liquid crystal lens and the function for controlling focus of liquid crystal lens.

Another purpose of the present invention is to provide an active liquid crystal array device, in which the electric potential of the central electrode can be controlled by driving the gate electrode and the fringe electrode of active array, in order to control the lens effect and adjust the focus of liquid crystal lens.

Another purpose of the present invention is to control the resistance for the material of semiconductor layer by the gate electrode, in order to adjust the focus of liquid crystal lens According to the above-mentioned purpose, the present invention discloses an active liquid crystal array device. The active liquid crystal array device comprises a first transparent conductive substrate. A gate control electrodes is disposed on the first transparent conductive substrate, a first transparent insulation layer is disposed on the gate control electrode, a liquid crystal control electrode is disposed on the first transparent insulation layer, in which the liquid crystal control electrode includes a fringe electrode and a central electrode, a transparent semiconductor layer is disposed on the liquid crystal control electrode, a second transparent insulation layer is disposed on the transparent semiconductor layer, a first liquid crystal oriented layer is disposed on the first transparent conductive substrate, a second transparent conductive substrate which includes a transparent electrode and a second liquid crystal oriented layer, wherein the transparent electrode liquid crystal is disposed on the second transparent conductive substrate and a second oriented layer on the second transparent conductive substrate, and a liquid crystal layer is disposed between the first liquid crystal oriented layer and a second liquid crystal oriented layer.

In an embodiment of the present invention, the above-mentioned gate control electrode includes at least a gate electrode and a gate wire, and the gate wire is connected with the gate electrode electrically.

In an embodiment of the present invention, the above-mentioned fringe electrode and the central electrode of liquid crystal control electrode are isolated with the transparent electrode on the second transparent conductive substrate electrically.

In an embodiment of the present invention, the fringe electrode and the central electrode of the above-mentioned liquid crystal control electrode are periodically arranged alternately, and the gate electrode on the first transparent conductive substrate is disposed between the fringe electrode and the central electrode.

In an embodiment of the present invention, the above-mentioned gate control electrode and the fringe electrode extend to an edge of the first transparent conductive substrate, so that the gate control electrode and the fringe electrode connect with a driving circuit electrically.

In an embodiment of the present invention, the central electrode of the above-mentioned liquid crystal control electrode is the floating electrode.

According to the above-mentioned active liquid crystal array device, the present invention also discloses a fabrication method of the active liquid crystal array device. The method includes:

Providing a first transparent conductive substrate and a second transparent conductive substrate; forming a gate control electrode on the first transparent conductive substrate; forming a first transparent insulation layer on the gate control electrode; forming a liquid crystal control electrode on the first transparent insulation layer; forming a transparent semiconductor layer on the liquid crystal control electrode; forming a second transparent insulation layer on the transparent semiconductor layer; forming a first liquid crystal oriented layer on the second transparent insulation layer; forming a second liquid crystal oriented layer on the second transparent conductive substrate of the transparent electrode; combining the first transparent conductive substrate and the second transparent conductive substrate; injecting the liquid crystal material between the first transparent conductive substrate and the second transparent conductive substrate; and sealing the first transparent conductive substrate and the second transparent conductive substrate to form the active liquid crystal array device.

In an embodiment of the present invention, the method for forming the above-mentioned gate control electrode includes:

Forming a first transparent electrode on the first transparent conductive substrate; forming the pattern of the gate control electrode on the first transparent electrode; and etching the pattern of the gate control electrode on the first transparent electrode, in order to form the gate control electrode on the first transparent conductive substrate.

In an embodiment of the present invention, the method for forming the above-mentioned liquid crystal control electrode includes the followings:

Form a second transparent electrode on the first transparent insulation layer; form the pattern of the liquid crystal control electrode on the second transparent electrode; and etch the pattern of the liquid crystal control electrode on the second transparent electrode, in order to form the liquid crystal control electrode on the first transparent insulation layer.

Therefore, the advantage and spirit of the present invention can be understood further by the following detail description of invention and attached Figures.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

The active liquid crystal array device disclosed in the present invention includes two transparent conductive substrates coated with the transparent electrode. The transparent electrode on one of the transparent conductive substrate is etched to the required gate control electrode. The active liquid crystal array device may be cylindrical shape or circular shape.

Figure 1:
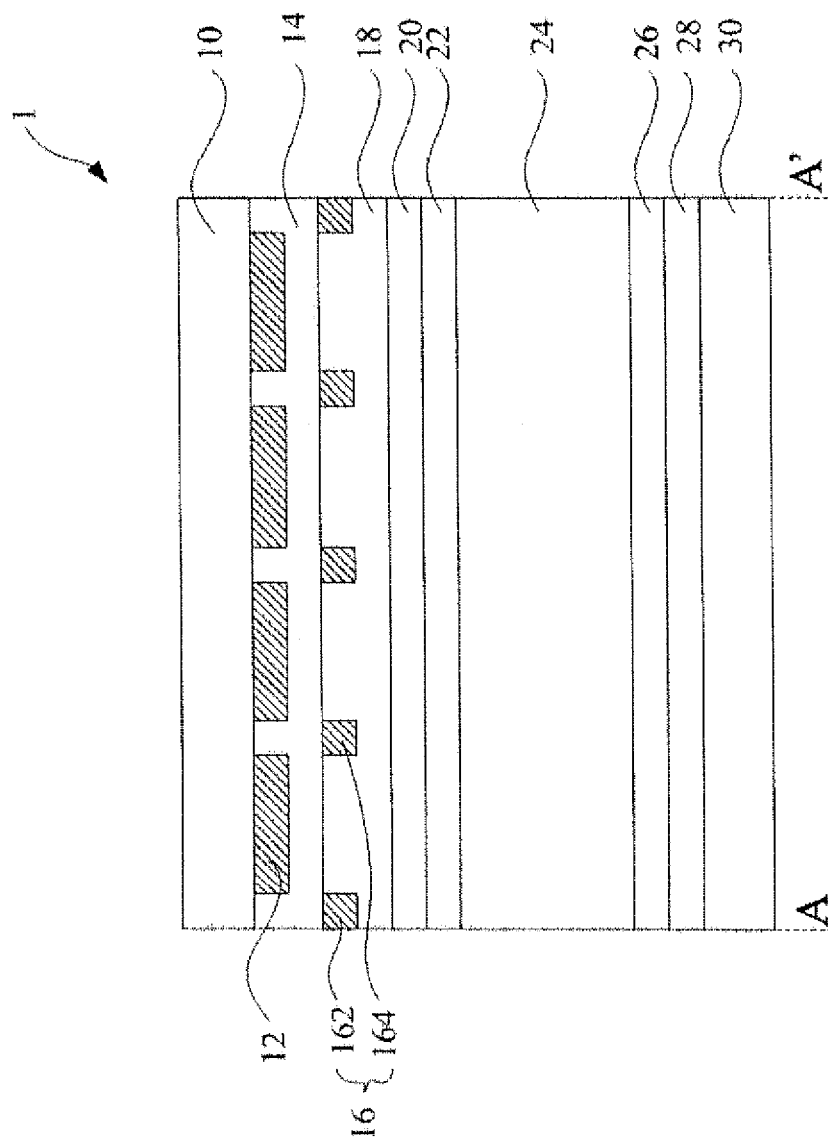
FIG. 1 shows the cross-sectional view of the cylindrical active liquid crystal array device according to the present invention.

Firstly, please refer to FIG. 1. FIG. 1 shows the cross-sectional view of the cylindrical active liquid crystal array device. In FIG. 1, the active liquid crystal array device 1 includes a first transparent conductive substrate 10, a gate control electrode 12, a first transparent insulation layer 14, a liquid crystal control electrode 16, a transparent semiconductor layer 18, a second transparent insulation layer 20, a first liquid crystal oriented layer 22, a liquid crystal layer 24, a second liquid crystal oriented layer 26, a transparent electrode 28 and a second transparent conductive substrate 30. The liquid crystal control electrode 16 further includes a central electrode 162 and a fringe electrode 164.

Figure 2:
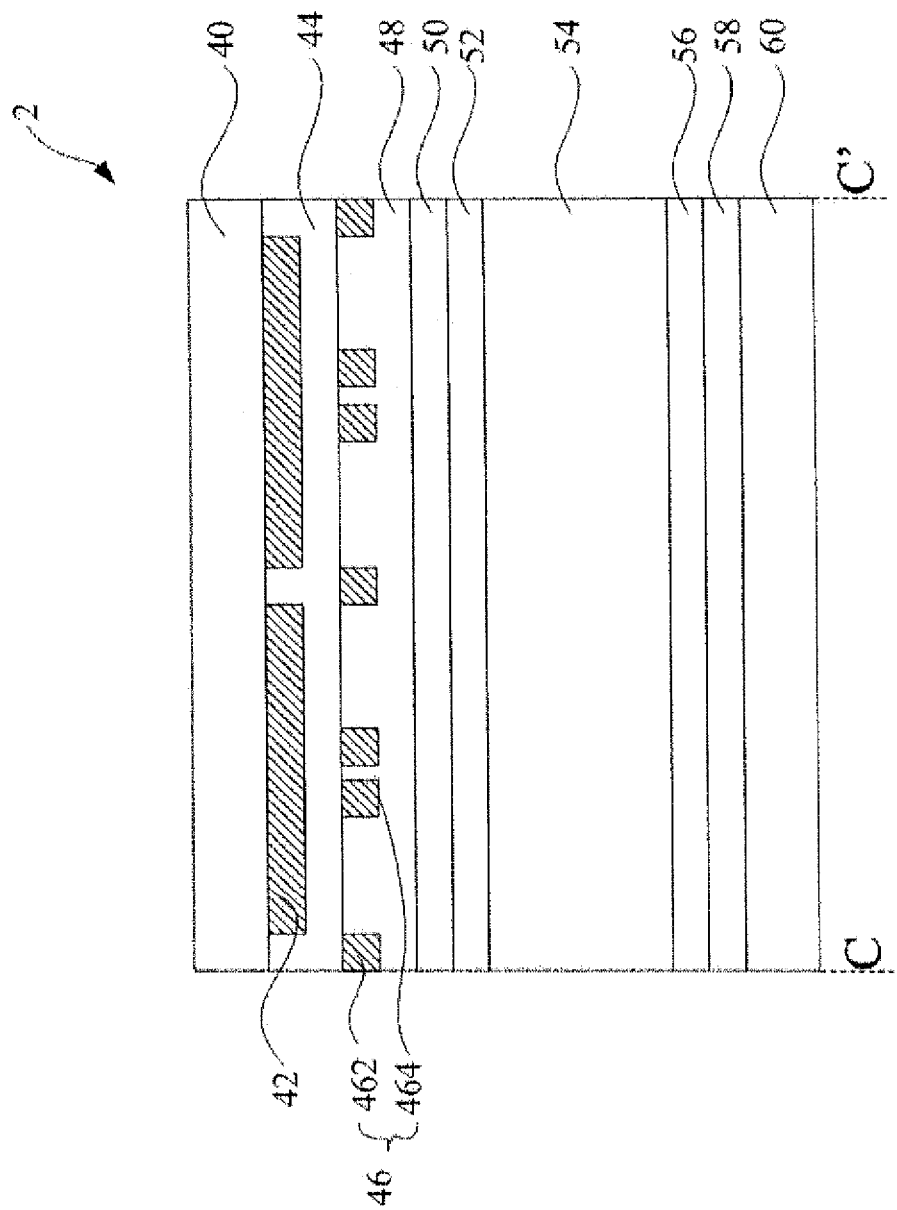
FIG. 2 shows the cross-sectional view of the circular active liquid crystal array device according to the present invention.

FIG. 2 shows the cross-sectional view of the circular active liquid crystal array device. The structure of FIG. 1 and FIG. 2 is same. The only difference is that the gate control electrode 12 of the active liquid crystal array device 1 in FIG. 1 is cylindrical shape, and the gate control electrode 42 of the active liquid crystal array device 2 in FIG. 2 is circular shape.

Then, the fabrication method of the active liquid crystal array device 1 is described as follows. It has to describe that the fabrication method of the active liquid crystal array device 1 in FIG. 1 and the active liquid crystal array device 2 in FIG. 2 is the same. Only the fabrication method of the active liquid crystal array device 1 is described as follows.

Firstly, as shown in FIG. 1, providing a first transparent conductive substrate 10 and a second transparent conductive substrate 30 are carried out, wherein the first transparent conductive substrate 10 and the second transparent conductive substrate 30 may be the transparent ITO glass substrate. And then, forming a gate control electrode 12 on the first transparent conductive substrate 10 is achieved. In the present invention, the steps for forming the gate control electrode 12 include the followings:

forming a transparent electrode (not shown in Figure) on the first transparent conductive substrate 10; and then, forming the pattern of gate control electrode on the transparent electrode; then, using the etching step to remove part of the transparent electrode in order to form a gate control electrode 12 on the first transparent conductive substrate 10, in which the gate control electrode 12 includes a gate electrode and a gate wire (not shown in Figure).

Then, please refer to FIG. 1 continuously. After the gate control electrode 12 is disposed on the first transparent conductive substrate 10, a first transparent insulation layer 14 is disposed on the gate control electrode 12. Then, a liquid crystal control electrode 16 is disposed on the first transparent insulation layer 14. In this embodiment, the steps for forming the liquid crystal control electrode 16 include the followings:

Form another transparent electrode (not shown in Figure) on the first transparent insulation layer 14; then, form the pattern of liquid crystal control electrode on the transparent electrode. And then, use the etching step to remove part of the transparent electrode, in order to form a liquid crystal control electrode 16 on the first transparent insulation layer 14. In the present invention, the liquid crystal control electrode 16 includes a central electrode 162 and a fringe electrode 164.

Then, as shown in FIG. 1, a transparent semiconductor layer 18 is disposed on the liquid crystal control electrode 16. Then, a second transparent insulation layer 20 is disposed on the transparent semiconductor layer 18, in order to protect the transparent semiconductor layer 18. Finally, a first liquid crystal oriented layer 22 is disposed on the second transparent insulation layer 20.

Then, as shown in FIG. 1, a transparent electrode 28 is disposed on another second transparent conductive substrate 30, and a second liquid crystal oriented layer 26 is disposed on this transparent electrode 28. After the first transparent conductive substrate 10 and the second transparent conductive substrate 30 are assembled, a liquid crystal layer 24 is injected and sealed between the first liquid crystal oriented layer 22 of the first transparent conductive substrate 10 and the second liquid crystal oriented layer 26 of the second transparent conductive substrate 30, in order to finish the active liquid crystal array device 1 or the active liquid crystal array device 2 shown in FIG. 2.

Figure 3:
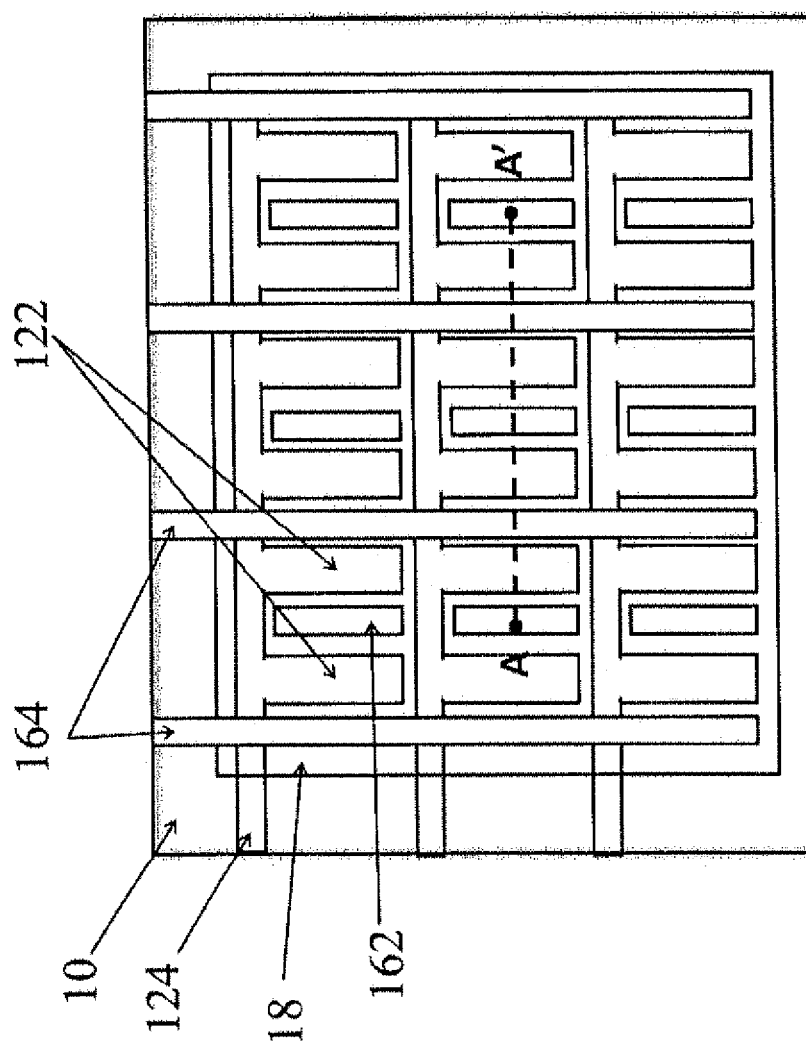
FIG. 3 is the top view for the cylindrical active liquid crystal array device of FIG. 1.
Figure 4:
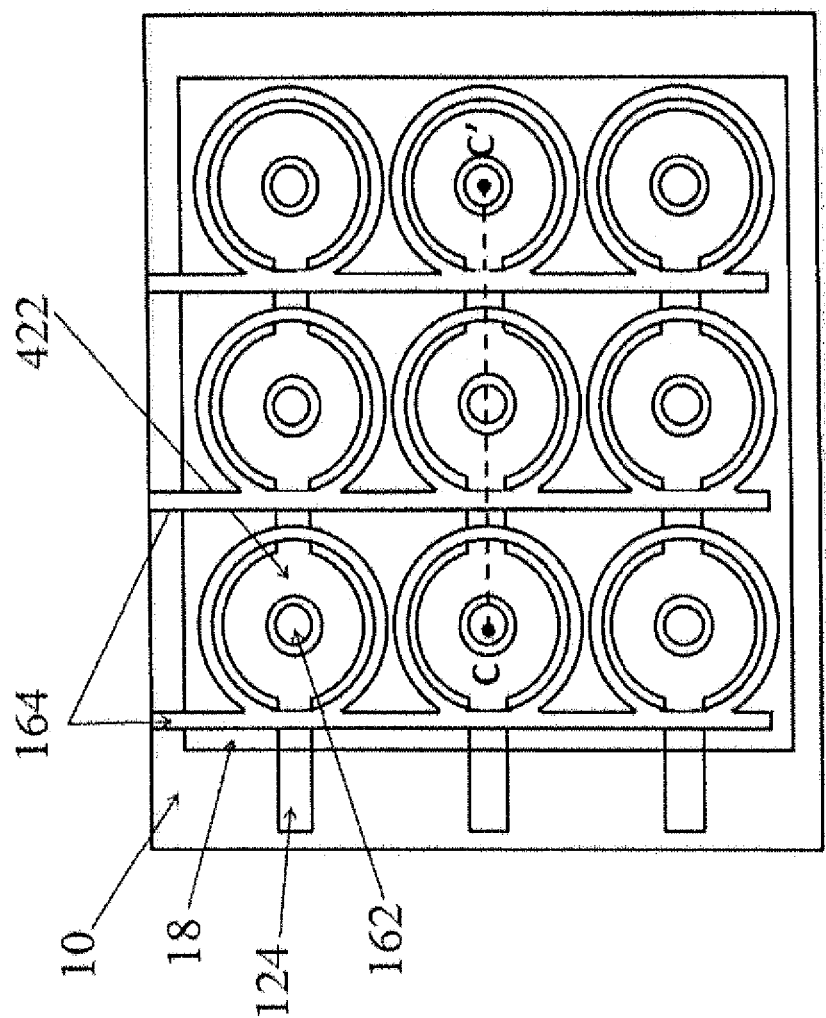
FIG. 4 is the top view for the cylindrical active liquid crystal array device of FIG. 2.

Please refer to FIG. 3 and FIG. 4. FIG. 3 is the top view for the cylindrical active liquid crystal array device of FIG. 1, and FIG. 4 is the top view for the circular active liquid crystal array device of FIG. 2. The difference between FIG. 3 and FIG. 4 is only that the gate control electrode 122 of the active liquid crystal array device 1 in FIG. 3 is cylindrical shape, and the gate control electrode 422 of the active liquid crystal array device 2 in FIG. 4 is circular shape. Therefore, only FIG. 3 is used for the description. In addition, the liquid crystal can be divided into the positive type and the negative type in accordance with the orientation of electric field and long axis of liquid crystal molecule. The long axis of positive-type liquid crystal molecule will be parallel to the orientation of electric field, and the long axis of negative-type liquid crystal molecule will be perpendicular to the orientation of electric field. The negative-type liquid crystal is used for the description in the embodiment of the present invention.

In FIG. 3, the gate control electrode 12 includes a plurality of gate electrode 122 and a plurality of gate wire 124. In the gate electrode 122, every gate wire 124 is connected with a plurality of gate electrode 122 electrically, and extended to the outside of the active liquid crystal array device 1 or the edge of the first transparent conductive substrate 10, so that the gate electrode 122 can be connected with the driving electrode (not shown in Figure) electrically. The driving circuit can apply the voltage to every gate electrode 122, so that the gate electrode 122 can control the resistance of the transparent semiconductor layer 18 underneath (see FIG. 1). Therefore, the current passing through the transparent semiconductor layer 18 and the electric potential difference between the fringe electrode 164 and the central electrode 162 of the liquid crystal control electrode 16 can be controlled. In addition, the fringe electrode 164 of the liquid crystal control electrode 16 is extended to the outside of the active liquid crystal array device 1 or the edge of the first transparent conductive substrate 10 (not shown in Figure), in order to be connected with the driving circuit (not shown in Figure) electrically. In addition, the central electrode 162 of the liquid crystal control electrode 16 is floating, which is not connected with any driving circuit electrically. The transparent semiconductor layer 18 is disposed between the fringe electrode 164 and the central electrode 162.

In an embodiment of the present invention, as shown in FIG. 3, the gate electrode 12 can be used to adjust the transparent semiconductor layer 18 between the fringe electrode 164 and the central electrode 162.

Figure 5A:
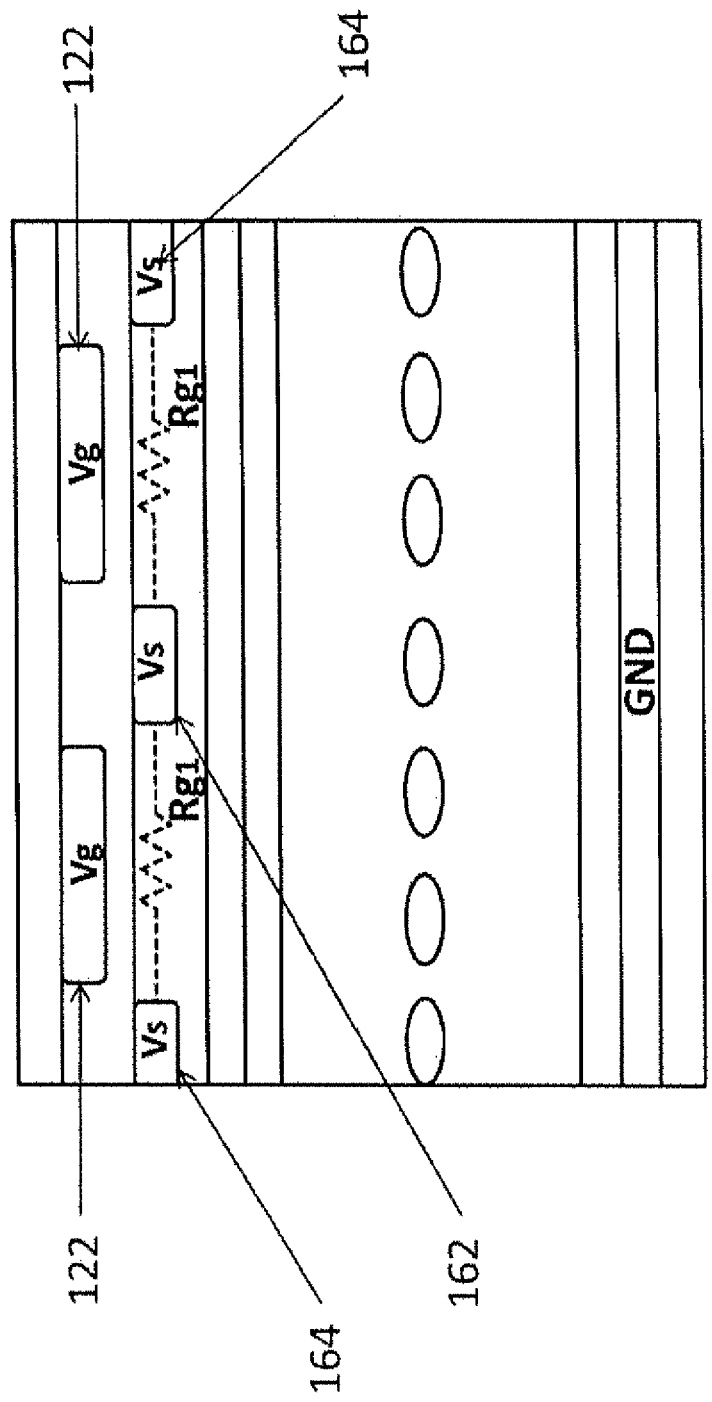
FIG. 5a and FIG. 5b show that the active liquid crystal array device uses the gate electrode to change the resistance of the transparent semiconductor layer for forming the lens effect.
Figure 5B:
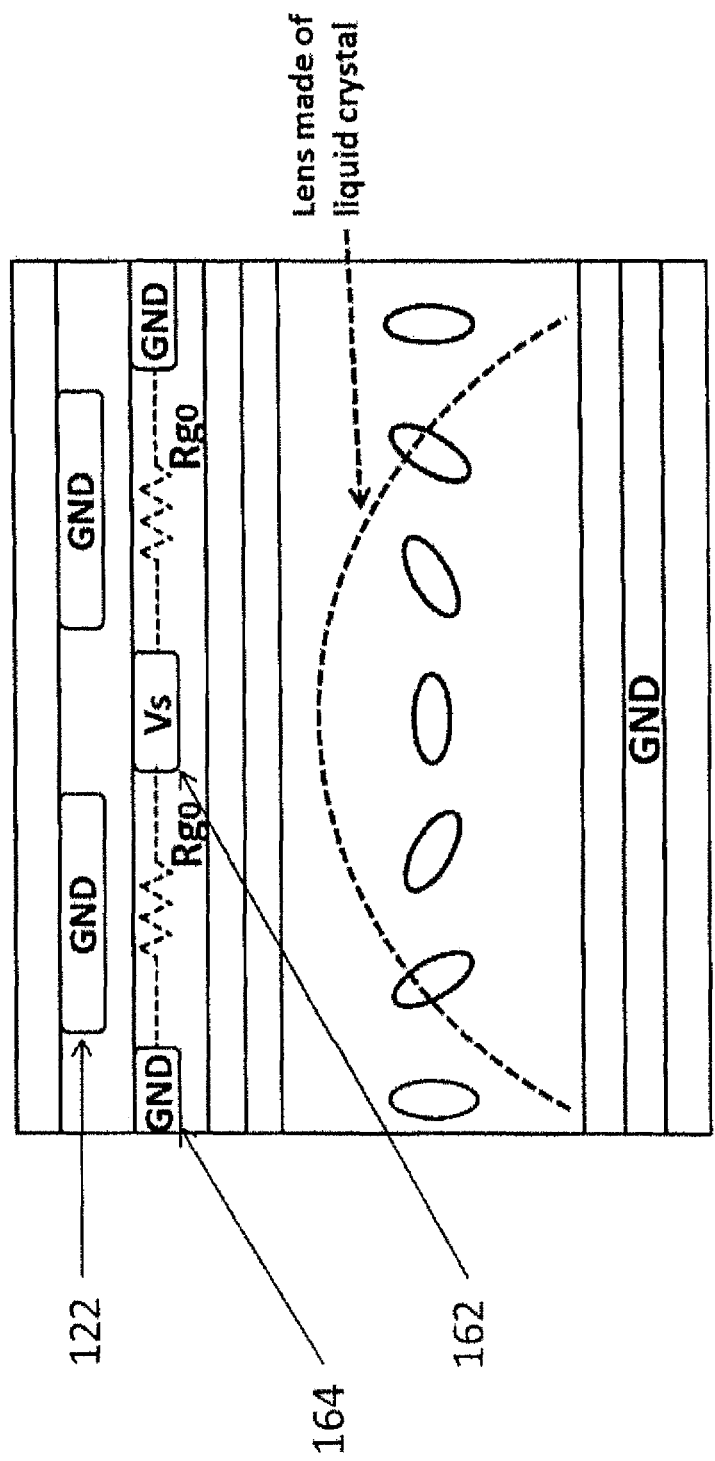

Please refer to FIG. 5a and FIG. 5b, which show that the active liquid crystal array device uses the gate electrode to change the resistance of the transparent semiconductor layer for forming the lens effect. In FIG. 5a, the cylindrical active liquid crystal array device 1 is used as the example. An electric potential $V_g$ is applied to the gate electrode 122, so that the resistance $R_{g1}$ of the transparent semiconductor layer 18 between the fringe electrode 164 and the central electrode 162 approaches the conductor, and the fringe electrode 164 and the central electrode 162 are considered to be conducted. Thus, the fringe electrode 164 can be used to control the electric potential of central electrode 162. If the electric potential of fringe electrode 164 is $V_s$, the electric potential of central electrode 162 is also $V_s$. After the gate electrode 122 is grounded, the electric potential of central electrode 162 will be kept at $V_s$, as shown in FIG. 5b.

In FIG. 5b, the resistance of transparent semiconductor layer 18 between the fringe electrode 164 and the central electrode 162 is $R_{s0}$. The fringe electrode 164 is grounded and the transparent electrode 28 (see FIG. 1) of the second transparent conductive substrate 30 is grounded. The electric potential difference between the central electrode 162 and the fringe electrode 164 will influence the orientation distribution of liquid crystal molecule of the liquid crystal layer 24, in which the liquid crystal layer 24 will form the lens effect. In addition, the electric potential of the transparent semiconductor layer 18 in the active liquid crystal array device 1 can be smoothly and gradually changed between the central electrode 162 and the fringe electrode 164, and the shape of liquid crystal lens can also be changed smoothly and gradually.

Please refer to FIG. 6a, FIG. 6b, FIG. 6c and FIG. 6d, which show the local switchable liquid crystal lens of the cylindrical active liquid crystal array device. FIG. 6a, FIG. 6b, FIG. 6c and FIG. 6d show the 3×3 cylindrical active liquid crystal array device, and FIG. 7a, FIG. 7b, FIG. 7c and FIG. 7d show the 3×3 circular active liquid crystal array device. The gate electrode 122 and the fringe electrode 164 are driven to control if the liquid crystal layer 24 in the active liquid crystal array device 1 has the lens effect to reach the localized effect.

Figures 6A, 6B:
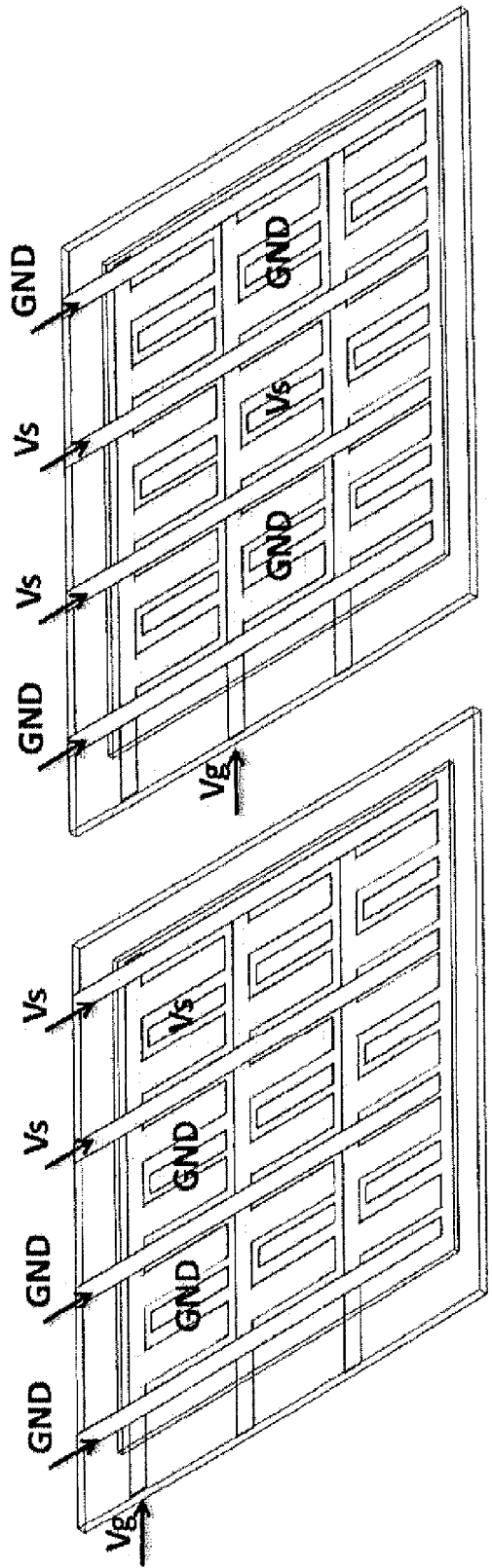
FIG. 6a, FIG. 6b, FIG. 6c and FIG. 6d show the local switchable liquid crystal lens of the cylindrical active liquid crystal array device according to the present invention.

As shown in FIG. 6a, when the first gate wire 124 is driven, the electric potential $V_g$ is applied, the channel of the transparent semiconductor layer 18 between the fringe electrode 164 and the central electrode 162 on the gate electrode 122 is opened. It means that the fringe electrode 164 can control the electric potential of the central electrode 162 to input the electric potential to every fringe electrode 164, in order to control the electric potential of every central electrode 162 on this gate wire 124. Every gate wire 124 is driven to determine the electric potential of every central electrode 162 on the gate wire 124.

Figures 6C, 6D:
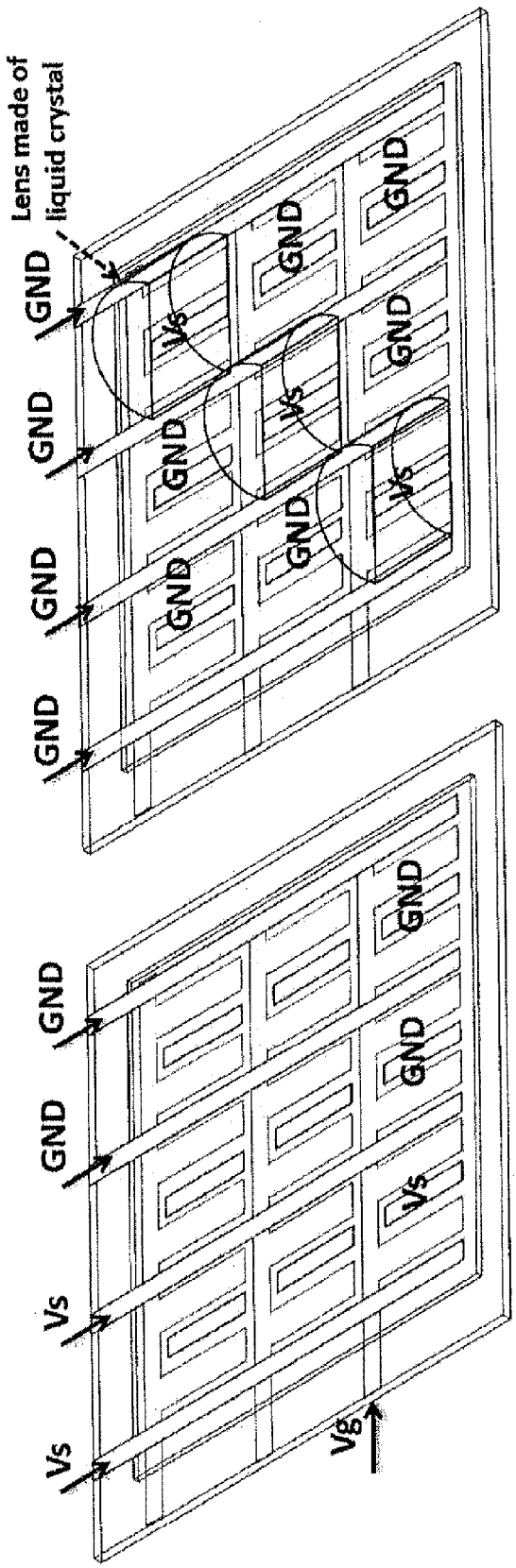

As shown in FIG. 6b and FIG. 6c, after every gate wire 124 is driven, every central electrode 162 in the array will have different electric potential. As shown in FIG. 6d, every fringe electrode 164 is grounded (GND). As for the central electrode 162 with the electric potential $V_s$, because there is electric potential difference for the fringe electrode 164 at both sides, the liquid crystal in this region will have the lens effect. As for the grounded central electrode 162, because there is no electric potential difference for the fringe electrode 164 at both sides, the liquid crystal in this region will not have the lens effect.

Figure 7B:
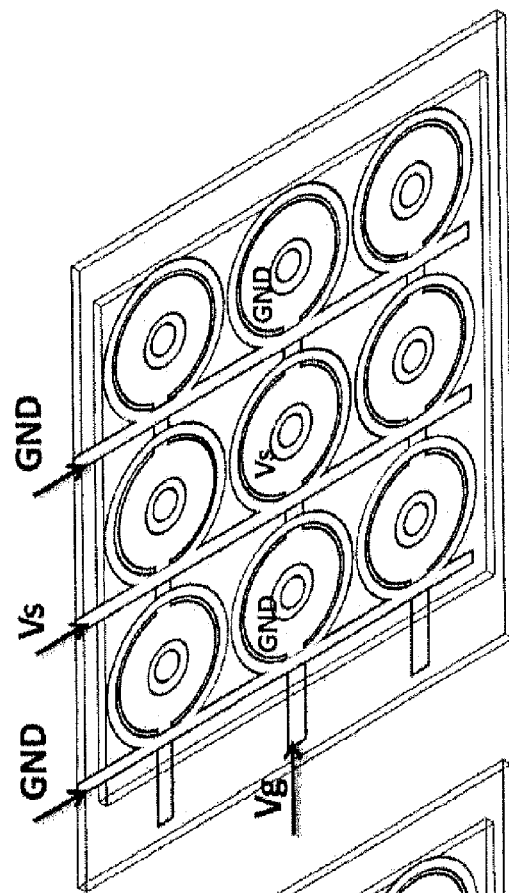
FIG. 7a, FIG. 7b, FIG. 7c and FIG. 7d show the local switchable liquid crystal lens of the circular active liquid crystal array device according to the present invention.
Figure 7A:
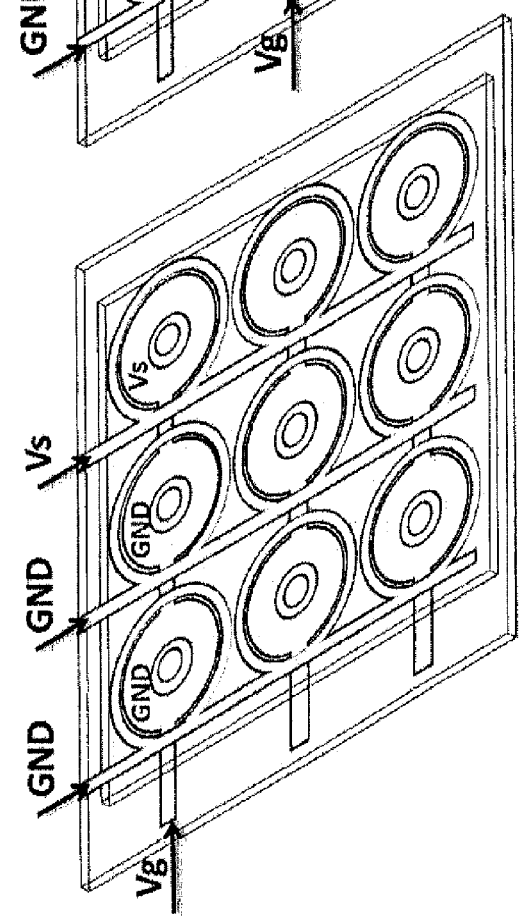
Figures 7C, 7D:
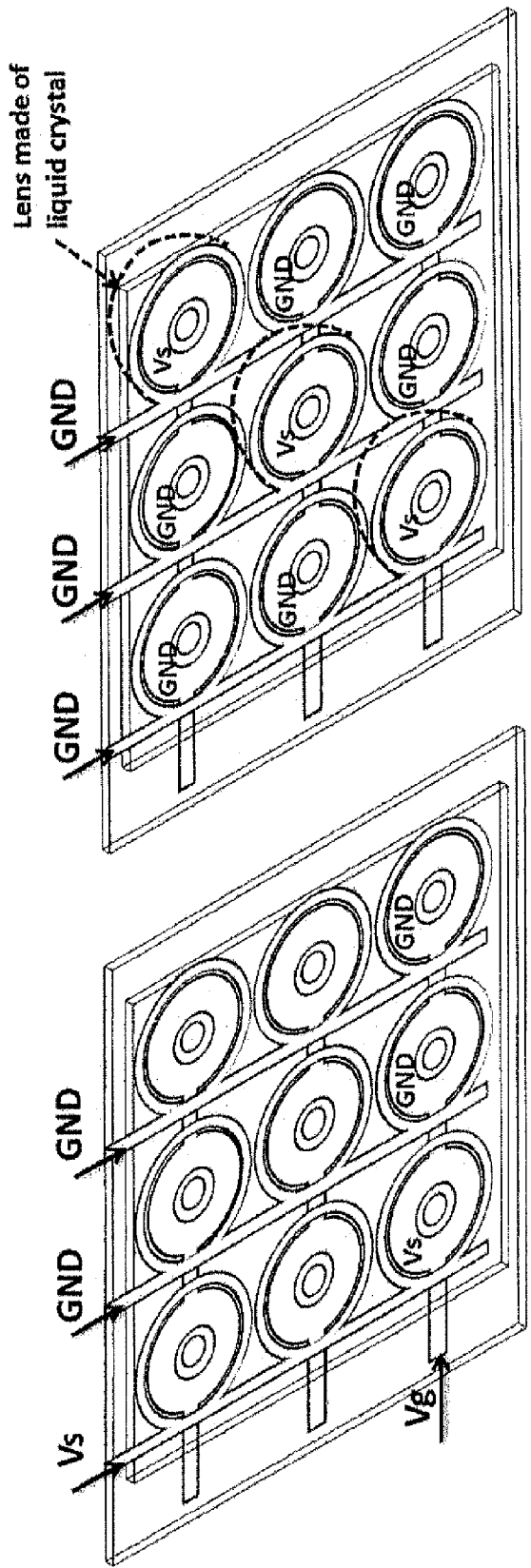

As for the circular active liquid crystal array device 2 shown in FIG. 7a, FIG. 7b, FIG. 7c and FIG. 7d, the same driving way of the cylindrical active liquid crystal array device 1 is used to drive every gate wire 124 shown in FIG. 7a, FIG. 7b and FIG. 7c to obtain localized control effect shown in FIG. 7d.

In addition, the cylindrical active liquid crystal array device 1 or the circular active liquid crystal array device 2 disclosed by the present invention also has the function for controlling the focus of liquid crystal lens. The gate electrode 122 is used to change the resistance of transparent semiconductor layer 18 to change the focus of liquid crystal lens.

Figure 8A:
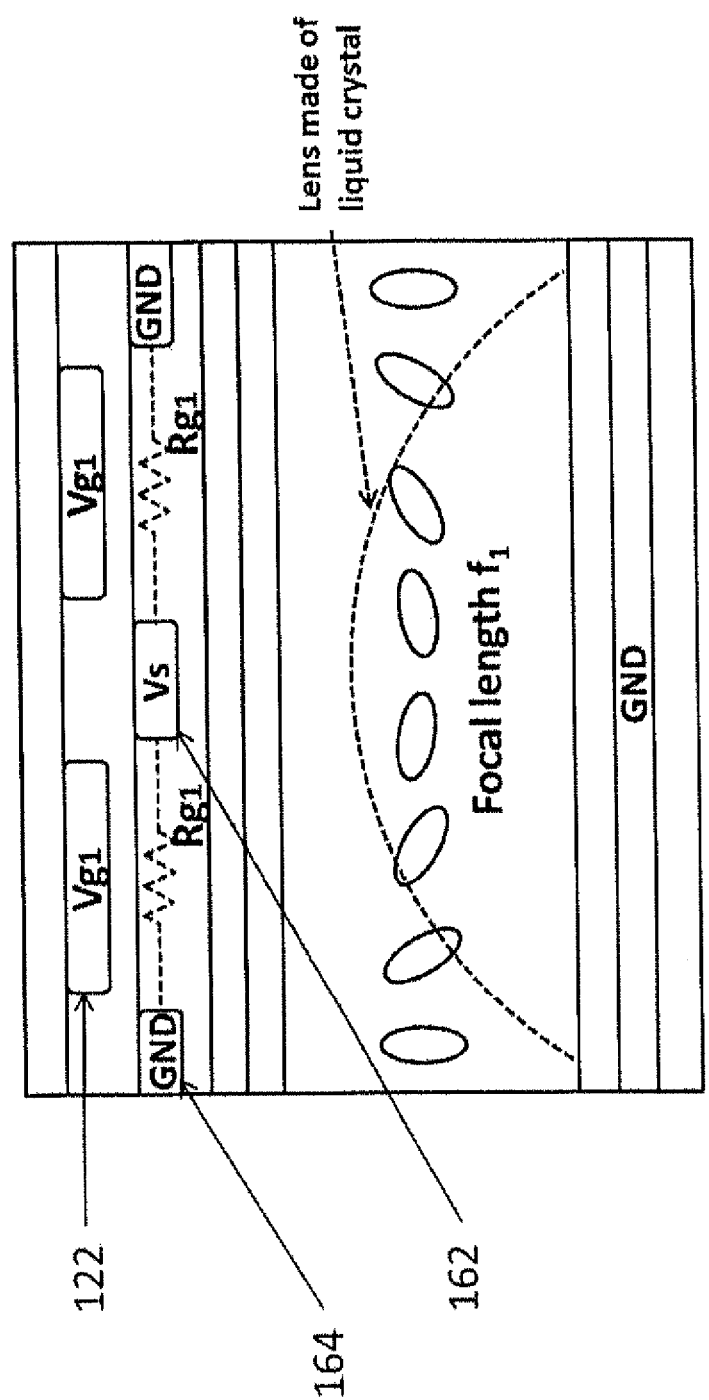
FIG. 8a and FIG. 8b show that the active liquid crystal array device controls the resistance of transparent semiconductor layer to adjust the focus of liquid crystal lens according to the present invention.
Figure 8B:
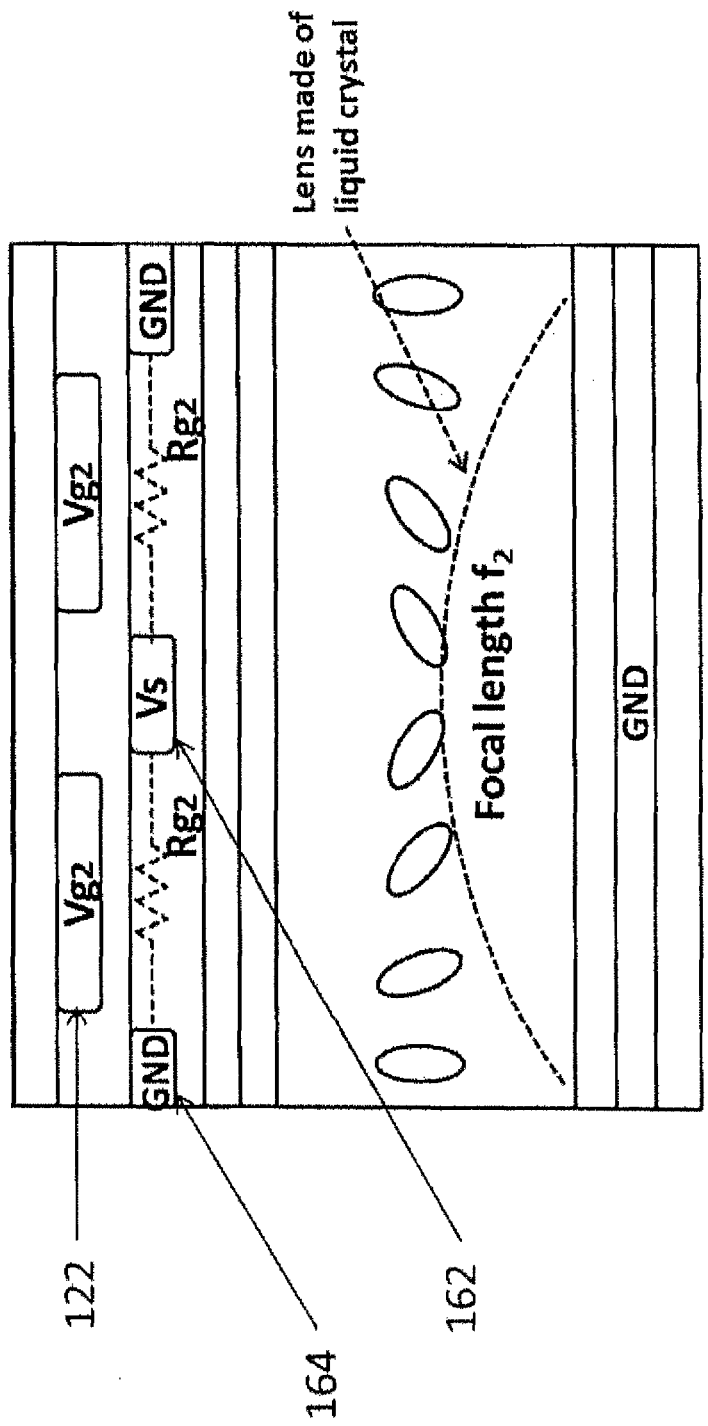

Please refer to FIG. 8a and FIG. 8b, which show that the active liquid crystal array device controls the resistance of transparent semiconductor layer to adjust the focus of liquid crystal lens.

In FIG. 8a, the electric potential of central electrode 162 is $V_s$, and the fringe electrode 164 is grounded. The electric potential $V_{g1}$ is applied by the gate electrode 122, so that the resistance of transparent semiconductor layer 18 is $R_{g1}$. Due to this resistance and the electric potential difference between the fringe electrode 164 and the central electrode 162, the electric potential is changed gradually to form a liquid crystal layer 24 with focus $f_1$.

As shown in FIG. 8b, if the electric potential of gate electrode 122 is $V_{g2}$, the resistance of transparent semiconductor layer 18 will be $R_{g2}$. Because the electric potential of gate electrode 122 $V_{g2}$ is greater than $V_{g1}$ and the resistance of transparent semiconductor layer 18 $R_{g2}$ is less than $R_{g1}$, a smaller gradually change of electric potential between the fringe electrode 164 and the central electrode 162 is formed, so that the liquid crystal layer 24 forms a lens with larger focus $f_2$, in which $f_2$ is greater than $f_1$.

Figures 9A, 9B:
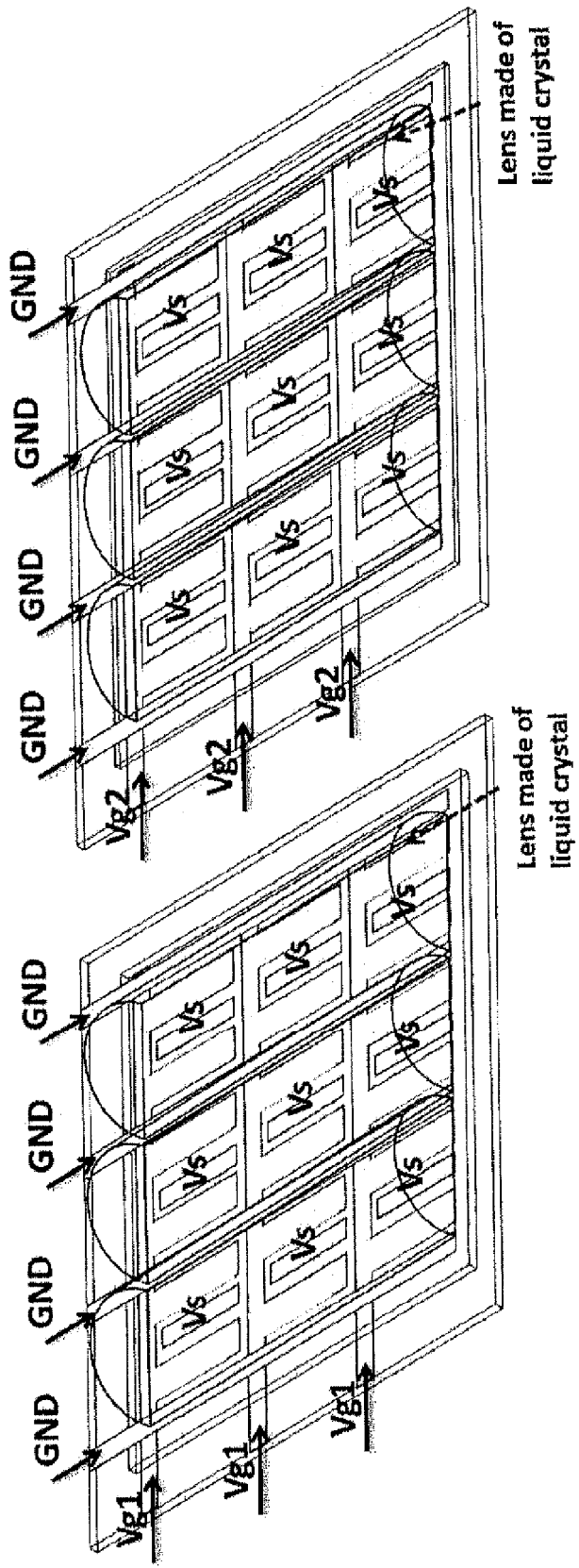
FIG. 9a and FIG. 9b, which show the function of cylindrical active liquid crystal array device for controlling the focus of liquid crystal lens according to the present invention.
Figures 10A, 10B:
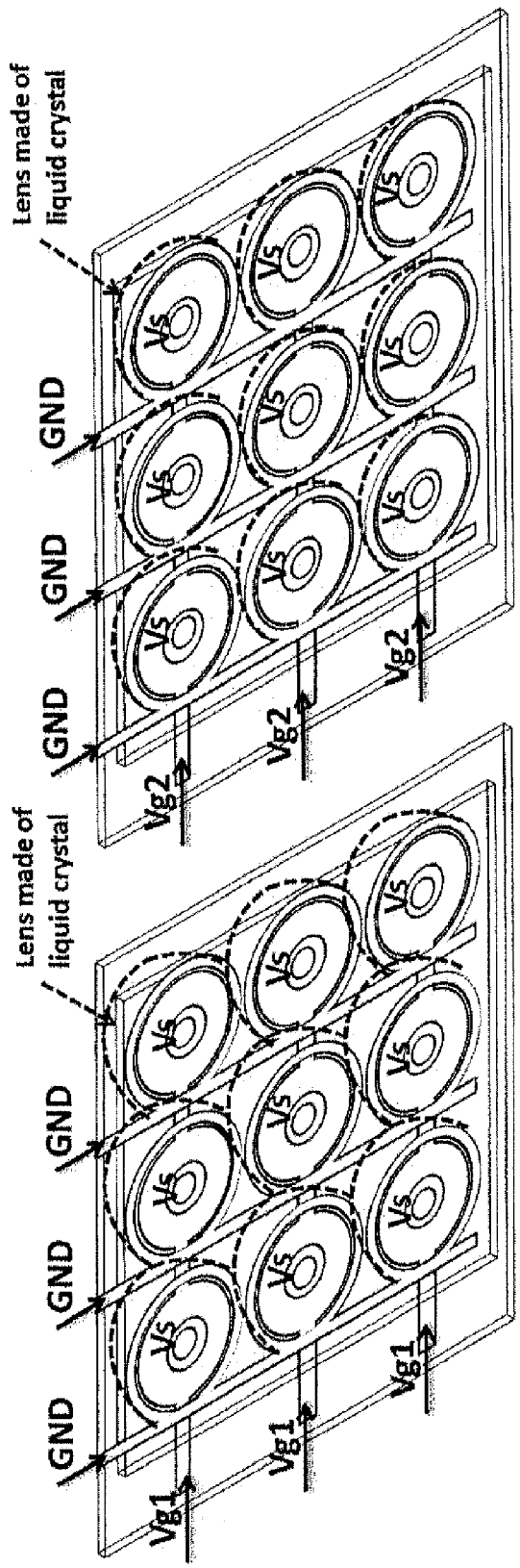
FIG. 10a and FIG. 10b show the function of circular active liquid crystal array device for controlling the focus of liquid crystal lens according to the present invention.

Please refer to FIG. 9a and FIG. 9b, which show the function of cylindrical active liquid crystal array device for controlling the focus of liquid crystal lens, and FIG. 10a and FIG. 10b show the function of circular active liquid crystal array device for controlling the focus of liquid crystal lens. According to the above-mentioned description, the resistance of transparent semiconductor layer 18 can be controlled through driving the gate electrode 122. Because the resistance of transparent semiconductor layer 18 is changed, the electric potential change between the fringe electrode 164 and the central electrode 162 can be controlled. As shown in FIG. 9a and FIG. 10a, due to the resistance of transparent semiconductor layer 18 is different, the lens with different focus can be formed. When the electric potential of gate electrode 122 is $V_{g1}$, the fringe electrode 164 is grounded, and the electric potential of central electrode 162 is $V_s$, the fringe electrode 164 and the central electrode 162 are connected by the transparent semiconductor layer 18, the electric potential change between the fringe electrode 164 and the central electrode 162 will be determined by the resistance of transparent semiconductor layer 18. Due to this gradually electric potential change, the liquid crystal layer 24 will have the lens effect.

Please refer to FIG. 9b and FIG. 10b. If the electric potential $V_{g2}$ is applied to the gate electrode 122, when $V_{g2}$ is greater than $V_{g1}$, the resistance of transparent semiconductor layer 18 under $V_{g2}$ will be less than that of $V_{g1}$. Thus, the electric potential change between the fringe electrode 164 and the central electrode 162 will be slower, and the focus formed will be longer, as shown in FIG. 8a and FIG. 8b. When the circular active liquid crystal array device 2 is used as the example, the focus of lens can also be controlled under the above-mentioned driving way. In addition, in the circular active liquid crystal array device 2, apply different electric potential to every gate wire 124, so that the liquid crystal lens on every gate wire 124 can have different focus.

In addition, the active liquid crystal array device 1 (or 2) disclosed in the present invention can use the gate electrode 122 to change the resistance of transparent semiconductor layer 18, in order to reach the function of local control for the focus of liquid crystal lens.

Please refer to FIG. 11a, FIG. 11b, FIG. 11c and FIG. 11d, which show that the active liquid crystal array device controls the electric potential of central electrode to adjust the focus of liquid crystal lens.

Figure 11A:
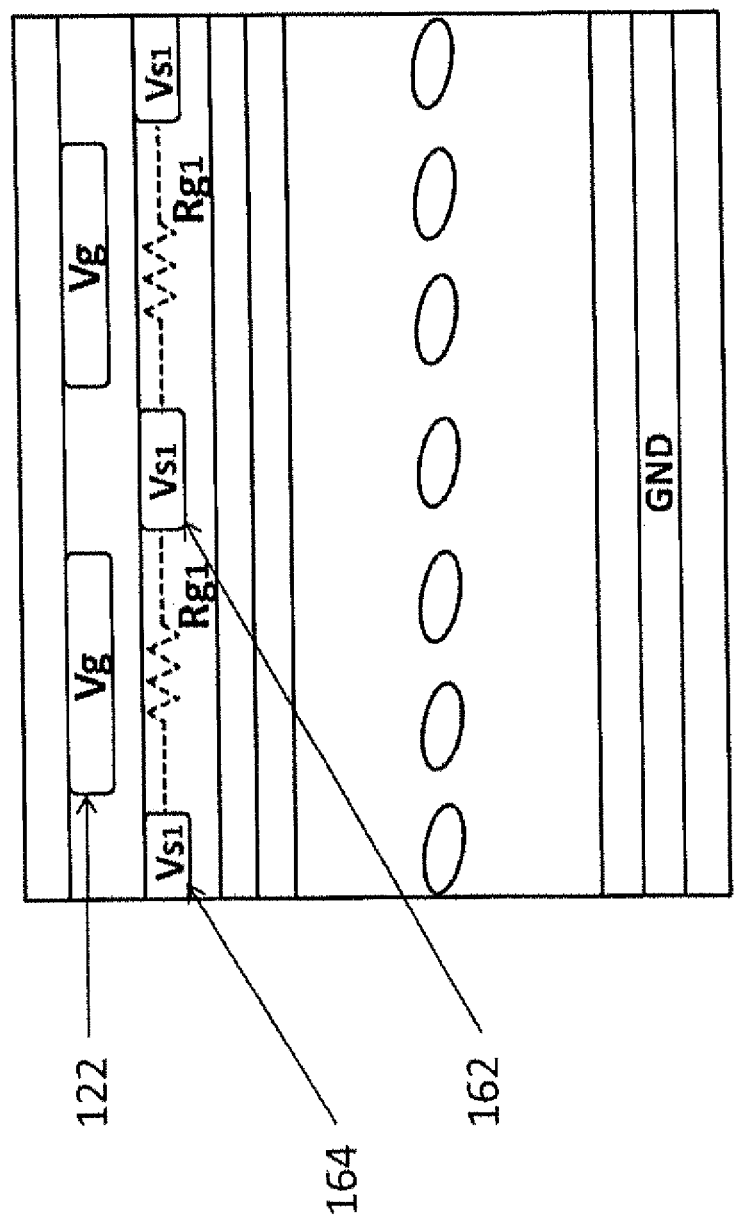
FIG. 11a, FIG. 11b, FIG. 11c and FIG. 11d show that the active liquid crystal array device controls the electric potential of central electrode to adjust the focus of liquid crystal lens according to the present invention.

As shown in FIG. 11a, the cylindrical active liquid crystal array device is used as the example. An electric potential $V_g$ is applied to the gate electrode 122, so that the resistance of transparent semiconductor layer 18 between the fringe electrode 164 and the central electrode 162 approaches the conductor, and the fringe electrode 164 and the central electrode 162 are considered to be conducted. Thus, the fringe electrode 164 can be used to control the electric potential of central electrode 162. If the electric potential of fringe electrode 164 is $V_{s1}$, the electric potential of central electrode 162 is also $V_{s1}$. After the gate electrode 122 is grounded, the electric potential of central electrode 162 will be kept at $V_{s1}$.

Figure 11B:
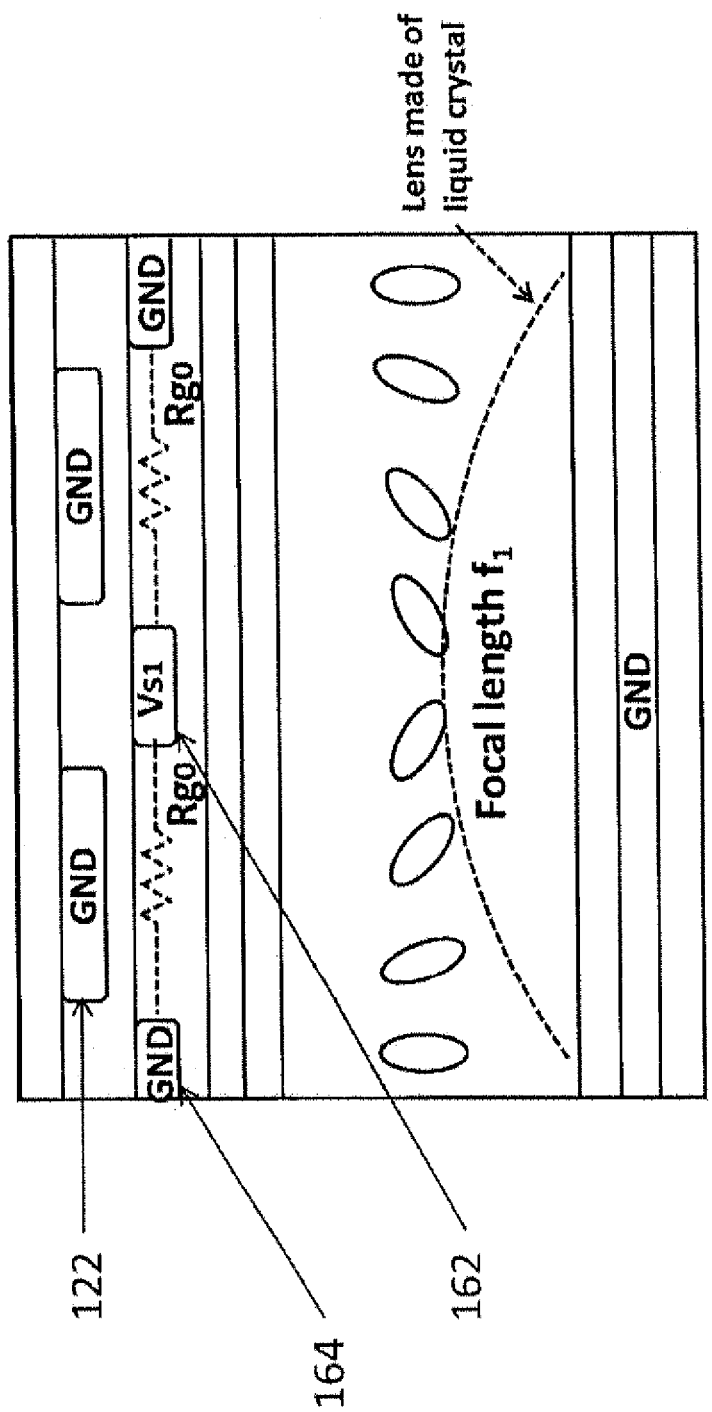

As shown in FIG. 11b, the resistance of transparent semiconductor layer 18 between the central electrode 162 and the fringe electrode 164 is $R_{g0}$. The fringe electrode 164 is grounded and the transparent electrode 28 of the second transparent conductive substrate 30 is grounded. The electric potential difference between the central electrode 162 $V_{s1}$ and the fringe electrode 164 will influence the orientation distribution of liquid crystal molecule of the liquid crystal layer 24, in which the lens with focus $f_1$ will be formed.

Figure 11C:
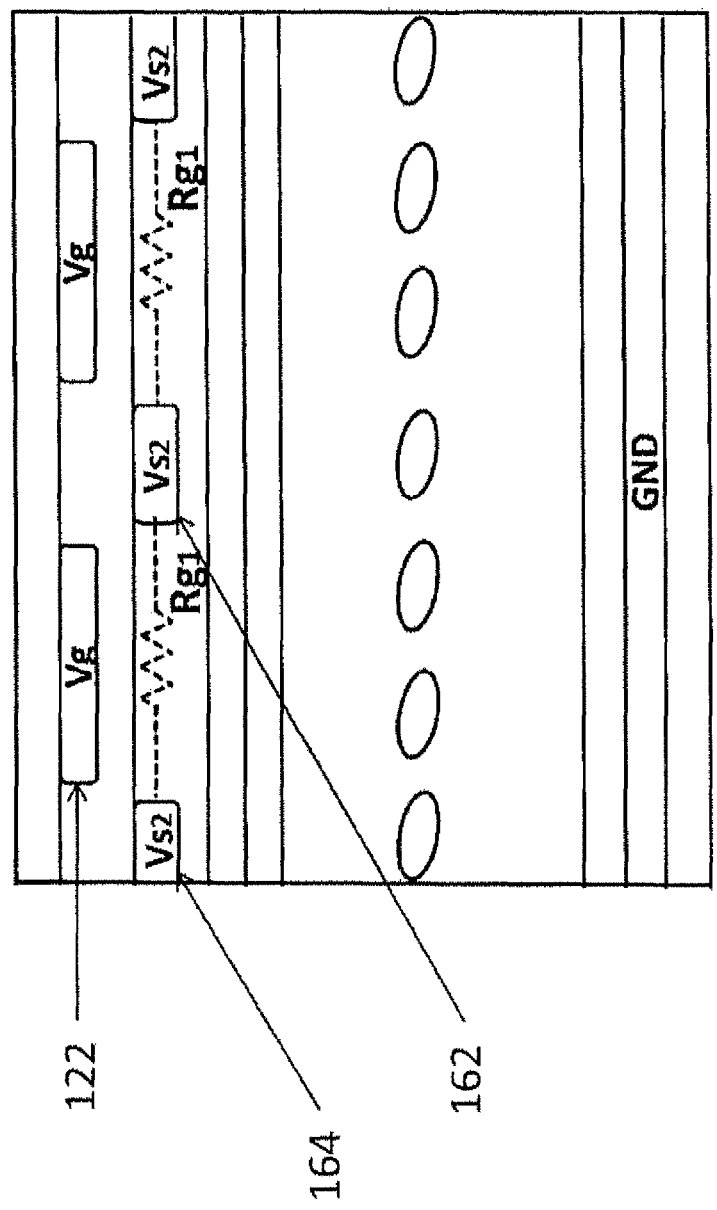
Figure 11D:
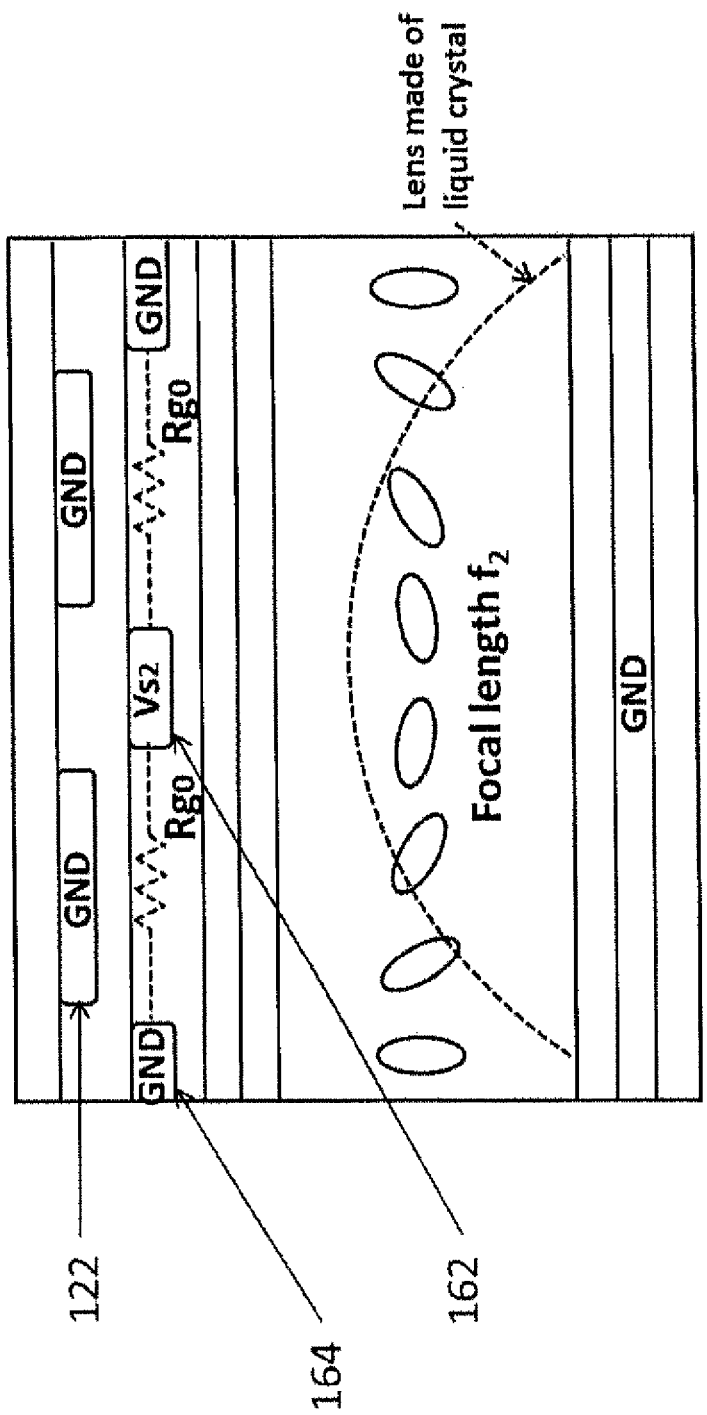

As shown in FIG. 11c, when the electric potential $V_{s2}$ is applied to the fringe electrode 164, the electric potential of central electrode 162 is also $V_{s2}$, and $V_{s2}>V_{s1}$, so that the liquid crystal layer 24 will form the lens with shorter focus $f_2$, as shown in FIG. 11d.

In the embodiment of the present invention, the electric potential of central electrode can be controlled to adjust the focus of liquid crystal lens. Please refer to FIG. 12a, FIG. 12b, FIG. 12c, and FIG. 12d, which show the function of cylindrical active liquid crystal array device for locally controlling the focus of liquid crystal lens. FIG. 13a, FIG. 13b, FIG. 13c, and FIG. 13d show the function of circular active liquid crystal array device for locally controlling the focus of liquid crystal lens.

Figures 12A, 12B:
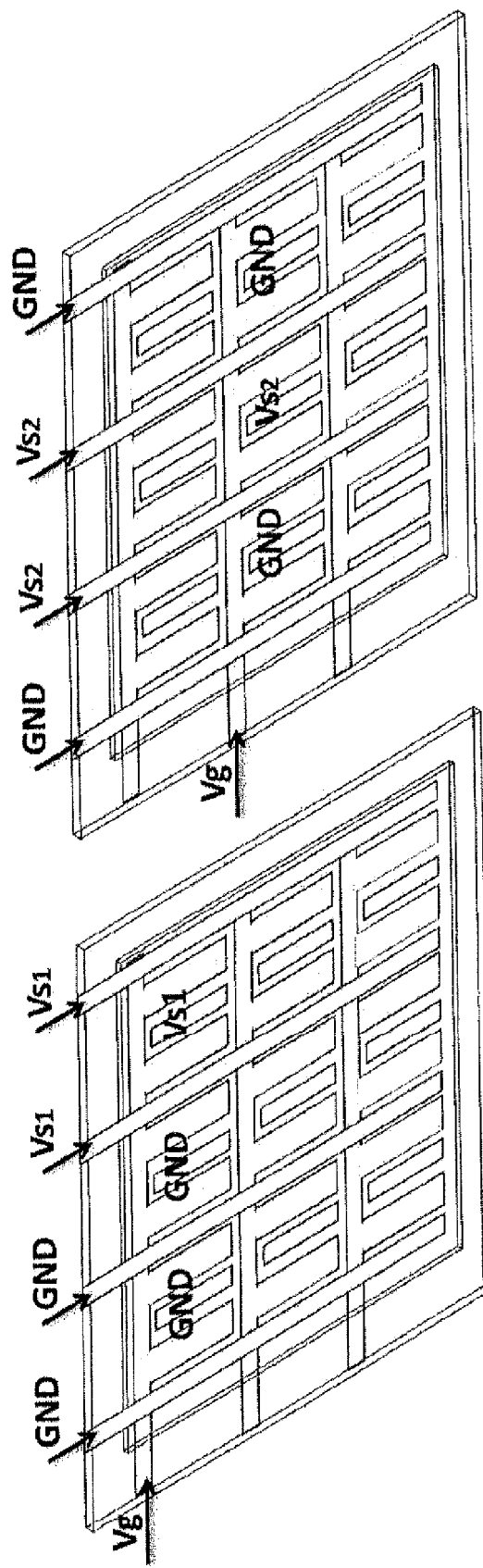
FIG. 12a, FIG. 12b, FIG. 12c and FIG. 12d show the function of cylindrical active liquid crystal array device for locally controlling the focus of liquid crystal lens according to the present invention.
Figure 12D:
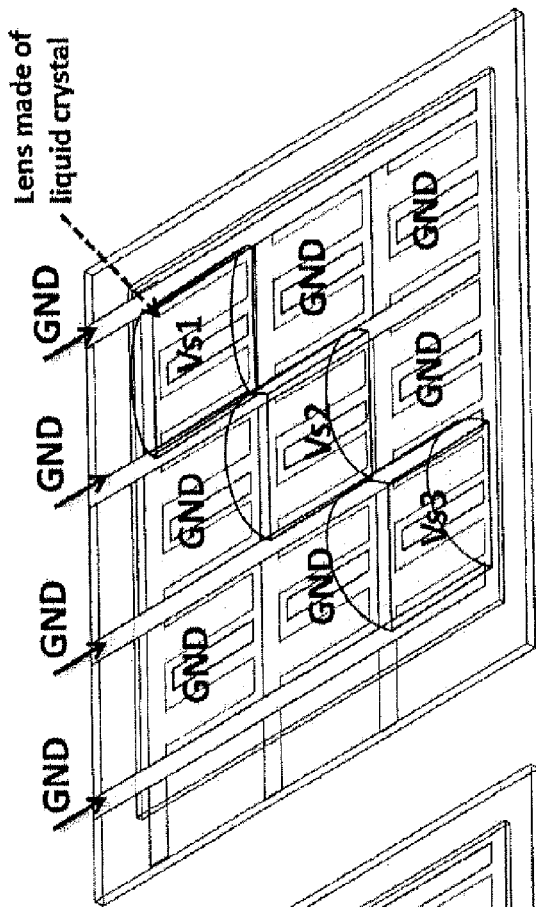
Figure 12C:
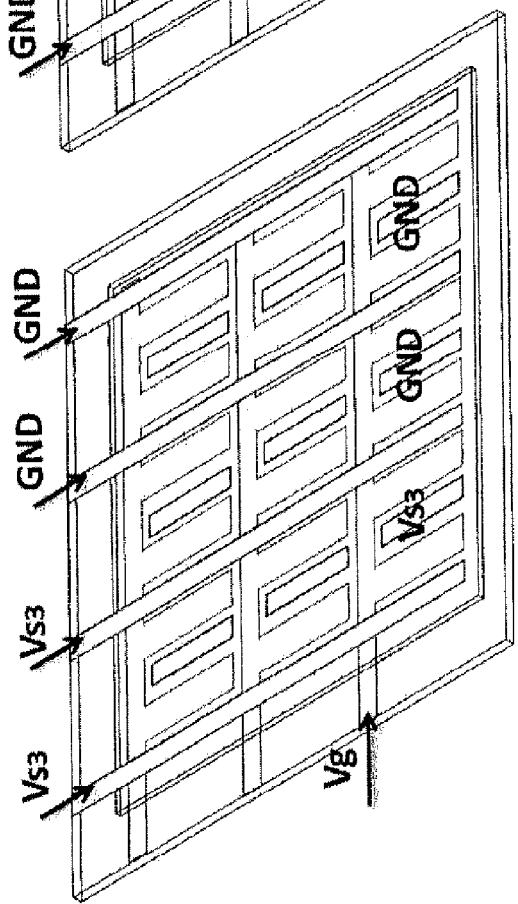
Figure 13B:
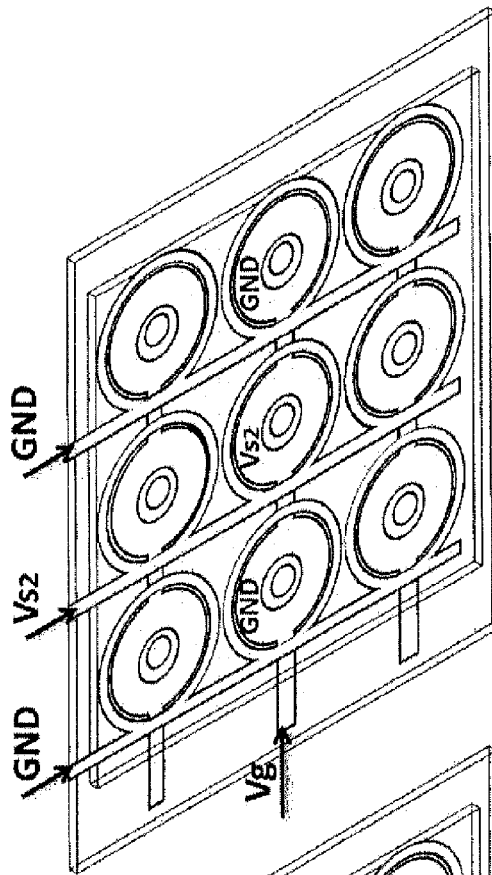
FIG. 13a, FIG. 13b, FIG. 13c and FIG. 13d show the function of circular active liquid crystal array device for locally controlling the focus of liquid crystal lens according to the present invention.
Figure 13A:
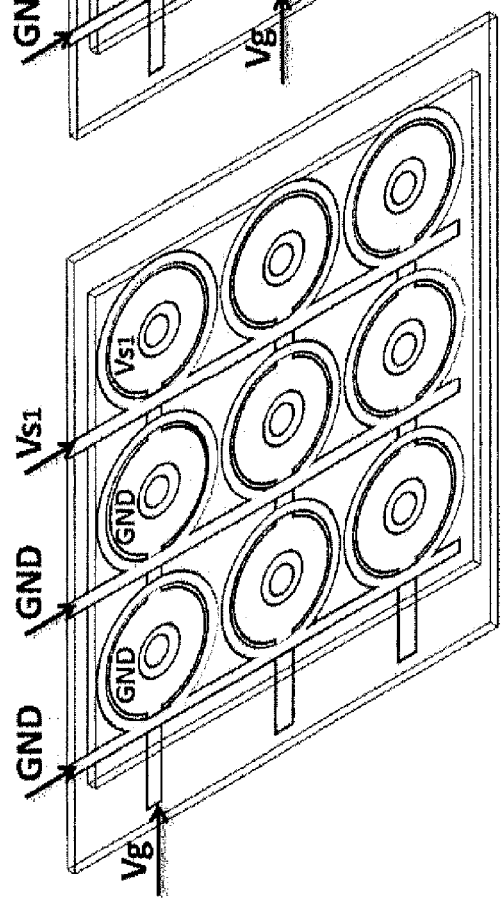
Figures 13C, 13D:
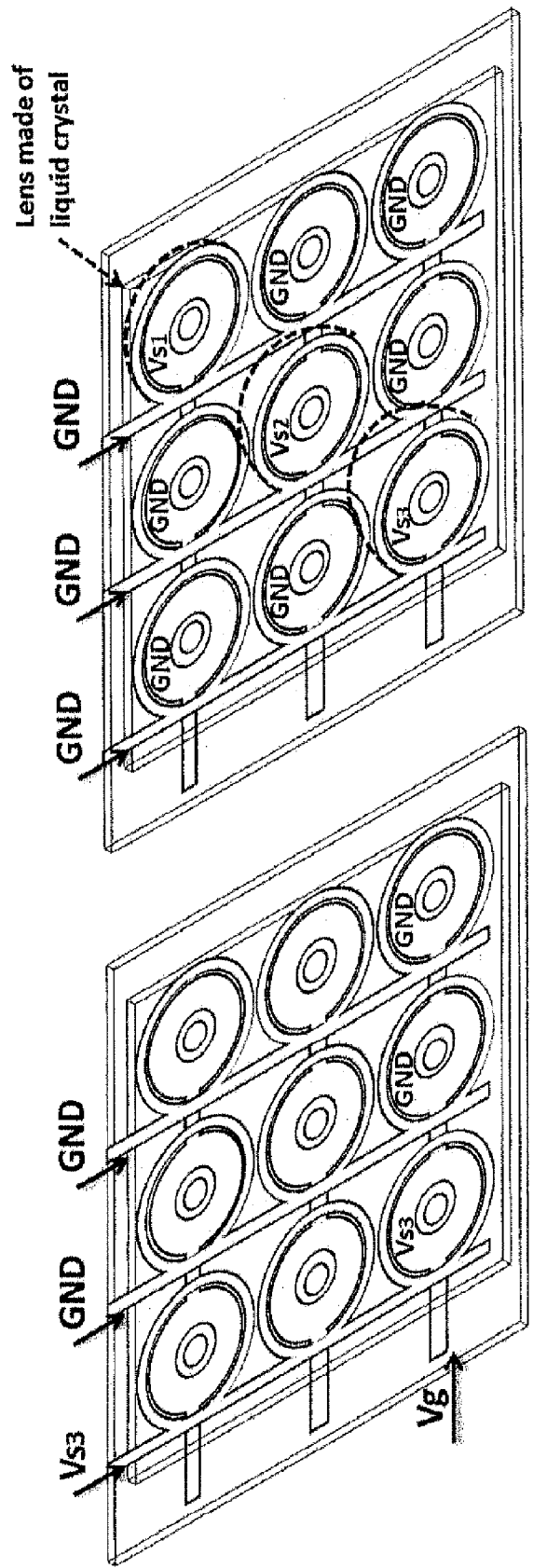

As shown in FIG. 12a, when the first gate wire 124 is driven, the electric potential $V_g$ is applied, the channel of the transparent semiconductor layer 18 between the fringe electrode 164 and the central electrode 162 on the gate electrode 122 is opened. It means that the fringe electrode 164 can control the electric potential of the central electrode 162 to input the electric potential to every fringe electrode 164, in order to control the electric potential of every central electrode 162 on this gate wire 124. Every gate wire 124 is driven to determine the electric potential of every central electrode 162 on the gate wire 124, as shown in FIG. 12b and FIG. 12c. After every gate wire 124 is driven, every central electrode 162 can have different electric potential, and the fringe electrode 164 is grounded, As shown in FIG. 12d, every central electrode 162 can have different electric potential, and $V_{s3}>V_{s2}>V_{s1}>GND$. There is different electric potential difference for the fringe electrode 164 at both sides. The liquid crystal layer 24 in this region will form the lens with different focus.

When the circular active liquid crystal array device 2 is used as the example, and referring to FIG. 13a, FIG. 13b, FIG. 13c, and FIG. 13d, the same driving as the above-mentioned cylindrical active liquid crystal array device 1 is used to drive every gate wire 124 to obtain local control effect.

Thus, in summary, the cylindrical or circular active liquid crystal array device provided by this invention can be controlled by driving the gate electrode and the fringe electrode of active array, in order to control the lens effect and adjust the focus of liquid crystal lens. In addition, the gate electrode can be used to control the resistance of transparent semiconductor layer to adjust the focus of liquid crystal lens. This active liquid crystal array device can be used as the optical array device of three-dimensional (3D) display. This array device can be manipulated to obtain whole array lens-less effect or whole array lens effect, to reach 2D/3D display switch of whole screen. The liquid crystal lens can also be switched locally to reach 2D/3D display switch of partial screen. In addition, the active liquid crystal array device can be used to acquire the stereo image, control the focus of every lens on array independently, to focus to different depth and record the depth in camera. In addition, the active liquid crystal array device can also be applied for relevant display in 3D active or 3D endoscopic surgery, and active micro-laser array modulation apparatus.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active liquid crystal array device, comprising:
   a first transparent conductive substrate;
   a gate control electrode being disposed on the first transparent conductive substrate;
   a first transparent insulation layer being disposed on the gate control electrode;
   a liquid crystal control electrode being disposed on the first transparent insulation layer, wherein the liquid crystal control electrode having a fringe electrode and a central electrode;
   a transparent semiconductor layer being disposed on the liquid crystal control electrode;
   a second transparent insulation layer being disposed on the transparent semiconductor layer;
   a first liquid crystal oriented layer being disposed on the first transparent conductive substrate;
   a second transparent electrode having a transparent electrode and a second liquid crystal oriented layer, wherein the second transparent electrode being disposed on a second transparent conductive substrate and the second liquid crystal oriented layer on the second transparent conductive substrate; and
   a liquid crystal layer is disposed between the first liquid crystal oriented layer and the second liquid crystal oriented layer.

2. The active liquid crystal array device according to claim 1, wherein the gate control electrode comprises a gate electrode and a gate wire, and the gate wire is connected with the gate electrode electrically.

3. The active liquid crystal array device according to claim 1, wherein the fringe electrode and the central electrode are isolated with the transparent electrode on the second transparent conductive substrate electrically.

4. The active liquid crystal array device according to claim 1, wherein the fringe electrode and the central electrode are periodically arranged alternately, and the gate electrode on the first transparent conductive substrate is disposed between the fringe electrode and the central electrode.

5. The active liquid crystal array device according to claim 1, wherein the gate control electrode and the fringe electrode extend to an edge of the first transparent conductive substrate, so that the gate control electrode and the fringe electrode connect with a driving circuit electrically.

6. The active liquid crystal array device according to claim 1, wherein the central electrode is the floating electrode.

7. A fabrication method of the active liquid crystal array device, comprising:
   providing a first transparent conductive substrate and a second transparent conductive substrate;
   forming a gate control electrode on the first transparent conductive substrate;
   forming a first transparent insulation layer on the gate control electrode;
   forming a liquid crystal control electrode on the first transparent insulation layer;
   forming a transparent semiconductor layer on the liquid crystal control electrode;
   forming a second transparent insulation layer on the transparent semiconductor layer;
   forming a first liquid crystal oriented layer on the second transparent insulation layer;
   forming a second liquid crystal oriented layer on the second transparent conductive substrate having a transparent electrode;
   combining the first transparent conductive substrate and the second transparent conductive substrate;
   injecting the liquid crystal material between the first transparent conductive substrate and the second transparent conductive substrate; and
   sealing the first transparent conductive substrate and the second transparent conductive substrate to form the active liquid crystal array device.

8. The fabrication method of the active liquid crystal array device according to claim 7, wherein the method for forming the gate control electrode comprises:
   forming a first transparent electrode on a first transparent conductive substrate;
   forming a pattern of a gate control electrode on the first transparent electrode; and
   etching the pattern of the gate control electrode on the first transparent electrode in order to form the gate control electrode on the first transparent conductive substrate.

9. The fabrication method of the active liquid crystal array device according to claim 7, wherein the method for forming the liquid crystal control electrode comprises:
   forming a second transparent electrode on a first transparent insulation layer;
   forming a pattern of a liquid crystal control electrode on the second transparent electrode; and
   etching the pattern of the liquid crystal control electrode on the second transparent electrode in order to form the liquid crystal control electrode on the first transparent insulation layer.

* * * * *